Patented Mar. 19, 1940

2,194,280

UNITED STATES PATENT OFFICE 2,194,280

TREATMENT OF HYDROCARBON GASES

Aristid V. Grosse, Chicago, Ill., assignor to Universal Oil Products Company, Chicago, Ill., a corporation of Delaware No Drawing. Application February 24, 1936,
Serial No. 65,537

9 Claims. (Cl. 260—683)

This invention relates to the treatment of paraffin hydrocarbons which are normally gaseous, including ethane, propane and the butanes, although hydrocarbons up to and including octane and higher homologs may be treated.

In a more specific sense, the invention is concerned with a process for converting the low boiling members of the paraffin series of hydrocarbons into their corresponding olefins which contain two atoms of hydrogen less per molecule and, consequently, have one double bond between carbon atoms.

There is a large commercial production of gaseous paraffin hydrocarbons. They occur in very large quantities in natural gas, particularly those gases associated with the production of crude oil and commonly known as casing-head gases, and this supply is further augmented by the gases produced in cracking oils for the production of gasoline, although this latter type of pyrolytically produced gas contains substantial quantities of olefins as well as paraffinic hydrocarbons.

The greater part of the paraffin gas production is used merely for domestic and industrial fuel purposes and not as a source of hydrocarbon derivatives, on account of the unreactive character of its components in comparison with their olefinic counterparts. A large part of the production is wasted to the atmosphere.

In one specific embodiment the invention comprises the dehydrogenation of gaseous paraffin hydrocarbons, particularly those containing three and four carbon atoms, such as propane and the butanes, at elevated temperatures in the presence of catalysts comprising essentially aluminum oxide supporting minor amounts of lower oxides of molybdenum. Lower boiling liquid hydrocarbons may also be treated according to the process although it is to be distinctly understood that such treatment is not the full equivalent of the treatment of gaseous hydrocarbons.

In the present instance, the catalysts which are preferred for selectively dehydrogenating the lower boiling paraffinic hydrocarbons have been evolved as the result of a large amount of investigation with catalysts having a dehydrogenating action upon various types of hydrocarbons such as are encountered in the fractions produced in the distillation and/or pyrolysis of petroleum and other naturally occurring hydrocarbon oil mixtures. The criterion of an acceptable dehydrogenating catalyst is that it shall split off hydrogen without inducing excessive scission of the bonds between carbon atoms or carbon separation. In the present invention catalyst mixtures comprising essentially major amounts of aluminum oxide and minor amounts of lower oxides of molybdenum, such as for example $MoO_2$ or $Mo_3O_8$, are used. Aluminum oxide alone functions to a very limited extent as a dehydrogenating catalyst in the above sense, and the tendency to selective splitting off of hydrogen on the one hand has been found to be greatly increased and the tendency to scission of the carbon-to-carbon bond on the other hand has been found to be greatly lessened by the use of the molybdenum oxides mentioned, so that the dehydrogenating action is rendered much more definite and effective, the yield of olefinic hydrocarbons is much greater, and the life of the catalyst is extended.

My investigations have also demonstrated that the catalytic efficiency of alumina is greatly improved by the presence of oxides of molybdenum even in minor amounts, usually of the order of less than 10% by weight of the alumina. It is common practice to utilize catalysts comprising 2 to 5% by weight of these molybdenum oxides.

The aluminum oxide to be used as a base material for the manufacture of catalysts for the process may be obtained from natural oxide minerals or ores such as bauxite or carbonates such as dawsonite by proper calcination, or it may be prepared by precipitation of aluminum hydrate from solutions of aluminum sulphate or different alums, the precipitate of aluminum hydroxide being dehydrated by heat, and usually it is desirable and advantageous to further treat it with air or other gases or by other means, for instance, leaching, etcetera, to activate it prior to use.

Two hydrated oxides of aluminum occur in nature, to-wit: bauxite, having the formula $Al_2O_3.2H_2O$, and diaspore, $Al_2O_3.H_2O$. In both of these oxides iron sesquioxide may partially replace the alumina. These two minerals or corresponding oxides produced from precipitated and suitably activated aluminum hydrate are adaptable for the manufacture of the present type of catalysts and in some instances have given the best results of any of the compounds whose use is at present contemplated. The mineral dawsonite having the formula

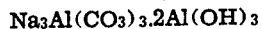

is another mineral which may be used as a source of aluminum oxide. It is of course to be understood that these are merely illustrative of sources of the aluminum oxide catalyst base and that other sources and types may also be available.

In making up catalyst composites of the character and composition which according to the present invention have been found specially well suited for catalyzing dehydrogenation reactions, the following is the simplest and generally the preferred procedure. An aluminum oxide mineral or the precipitated hydroxide is calcined at temperatures of from about 600° C. (1112° F.) to 900° C. (1652° F.) to produce a mixture containing a high percentage of aluminum oxide. The oxide is then ground to produce granules of relatively small mesh and these are caused to absorb compounds which will ultimately yield oxides of molybdenum on heating to a proper temperature by stirring them with warm and aqueous solutions of soluble molybdenum compounds, such as for example molybdenum pentachloride in hydrochloric acid solution, molybdic oxide in ammonia or nitric acid, and soluble molybdates, particularly ammonium molybdate having the formula

$(NH_4)_6Mo_7O_{24} \cdot 4H_2O$  (M. W.=1236.3)

The aluminum oxide resulting from calcination at the temperatures mentioned has a high absorptive capacity for solutions and readily takes up the required amounts of molybdenum compounds dissolved in aqueous solutions. To insure complete absorption of the molybdenum solutions and at the same time a uniform distribution upon the aluminum oxide granules, the latter are added to sufficiently concentrated solutions in such proportions that practically all of the solution is absorbed by the alumina. The molybdenum solution should be of such quantity and concentration that it will wet the whole mass of alumina granules without leaving any excess solution. The oxides resulting from the decomposition of many of the soluble molybdenum compounds are principally those in which molybdenum exhibits the higher valences, such as in molybdic oxide $MoO_3$. These oxides, however, are reduced by hydrogen, or by the paraffinic gases and the other gases resulting from their decomposition in the first stages of the dehydrogenation reactions so that the essential catalysts for the larger portion of the period of service appear to be the lower oxides.

The most readily available and utilizable compound for adding molybdenum oxides to alumina is the ammonium molybdate mentioned in the preceding paragraph. This compound is readily soluble in concentrated ammonia solutions, and after adding the amount corresponding to the amount of molybdenum found most suitable the granules are dried, first at 100° C. for about two hours and then at temperatures of the order of 300° C. for four to eight hours longer. If desired the oxides present on the alumina may then be reduced by hydrogen previous to the use of the composite catalyst in dehydrogenation reactions. The reduction to the lower oxides is accompanied by the development of a brown color. A very serviceable catalyst is made by dissolving approximately 20 parts by weight of the hydrated ammonium molybdate in 50 parts by weight of concentrated ammonia, diluting the solution with an equal volume of water and then adding this to 250 parts by weight of 10 to 12 mesh activated alumina. A solution used in this proportion is completely absorbed by the alumina granules without leaving any excess. The percentage of molybdenum on the alumina particles is then about 2.75. It should be emphasized that the oxides of molybdenum are the essential catalysts in the composite since without them the alumina possesses limited dehydrogenating ability.

In practicing the dehydrogenation of paraffinic gases according to the present process, a solid composite catalyst prepared according to the foregoing briefly outlined methods is used as a filler in a reaction tube or chamber in the form of particles of graded size or small pellets, and the gas to be dehydrogenated is passed through the catalyst after being heated to the proper temperature, usually within the range of from about 400° to 800° C. (752° to 1472° F.). The most commonly used temperatures, however, are around 500° C. to 600° C. (932° to 1112° F.). The catalyst tube is heated exteriorly to maintain the proper reaction temperature. The pressure employed may be subatmospheric, atmospheric or slightly superatmospheric of the order of from 50 to 100 pounds per square inch. While pressures up to 500 pounds per square inch may be employed in some cases, pressures of the order of atmospheric or below are generally preferred. The time during which the gases are exposed to dehydrogenating conditions in the presence of the preferred catalyst is comparatively short, usually below twenty seconds, and preferably as low as from 0.5 to 6 seconds.

It is an important feature of the present process that the gases to be dehydrogenated should be free from all but traces of water vapor, since the presence of any substantial amounts of steam reduces the catalytic effectiveness of the composite catalyst to a marked degree. In view of the empirical state of the catalytic art, it is not intended to submit a complete explanation of the reasons for the deleterious influence of water vapor in the present type of catalyzed reactions, but it may be suggested that the action of the steam is to cause a partial hydration of the alumina and the molybdenum oxides due to preferential adsorption, so that in effect the paraffin gases are prevented from reaching or being adsorbed by the catalytically active surface.

The exit gases from the catalytic tube or chamber may be passed through selective absorbents to combine with or absorb the olefin or olefin mixture produced, or the olefins may be selectively polymerized by suitable catalysts, caused to alkylate other hydrocarbons such as aromatics or paraffins or treated directly with chemical reagents to produce desirable and commercially valuable derivatives. After the olefins have been removed the residual gases may be recycled for further dehydrogenating treatment with or without removal of hydrogen.

The present types of catalysts are selective in removing two hydrogen atoms from a paraffin molecule to produce the corresponding olefin without furthering to any great degree undesirable side reactions, and because of this show an unusually high conversion of paraffins into olefins as will be shown in later examples. When the activity of these catalysts begins to diminish it is readily regenerated by the simple expedient of oxidizing with air or other oxidizing gas at a moderately elevated temperature, usually within the range employed in the dehydrogenating reactions. This oxidation effectively removes traces or carbon deposits which contaminate the surface of the particles and decrease their efficiency. It is characteristic of the present types of catalysts that they may be repeatedly regenerated without substantial loss of catalytic efficiency.

During oxidation with air or other oxidizing gas mixture in regenerating partly spent material there is evidence to indicate that the molybdenum oxides such as $MoO_2$ or $Mo_2O_3$ are to a large extent, if not completely, oxidized to $MoO_3$, which may combine with the alumina to form a certain amount of various aluminum molybdates. The existence of several aluminum molybdates is known, but analyses have indicated that their composition is rather indefinite so that they may possibly be solid solutions rather than definite chemical compounds. These aluminum molybdates are later decomposed by contact with reducing gases in the first stages of service to reform the lower oxides of molybdenum and regenerate the real catalyst and hence the catalytic activity.

Numerous experimental data could be adduced to indicate the results obtainable by employing the present type of catalyst to dehydrogenate paraffins, but the following example is sufficiently characteristic.

The catalyst was prepared by dissolving 19.5 parts by weight of ammonium molybdate in 50 parts of a concentrated ammonia solution, which was then diluted by the addition of about an equal volume of water. This solution was then added to 250 parts by weight of activated alumina produced by calcining bauxite at a temperature of about 700° C. and grinding and sizing to produce particles of approximately 10 to 12 mesh in diameter.

In the proportion stated the alumina exactly absorbed the solution. The particles were then dried at 100° C. for two hours, and then at gradually increasing temperatures from 200 to 350° C. for eight hours. They were then added to a reaction chamber and reduced by hydrogen at a temperature of 500° C., after which normal butane was passed through the chamber at a rate corresponding to a total contact time of about five seconds. The composition of the exit gas at this temperature is shown in column 1 of the appended table. Column 2 of the same table indicates the results obtained at 600° C. and a contact time of two seconds:

| Compound | 1 | 2 |
|---|---|---|
| Butylenes | 14.7 | 20.0 |
| Hydrogen | 15.0 | 27.0 |
| Methane and ethane | 0.6 | 2.4 |
| Propane | 0.0 | 1.8 |
| Propylene | 0.0 | 0.8 |
| Ethylene | 0.4 | 0.1 |
| n-Butane | 69.8 | 47.0 |

It will be observed from the above figures that greater percentages of butylenes were obtained at the higher temperature and shorter contact time, although the reaction of dehydrogenation was slightly less selective as indicated by the appearance of methane, ethane and propane due to secondary hydrogenating reactions. In the run at 600° C. the excess of hydrogen which would normally be equal to the volume of butylenes in perfect dehydrogenation was due to some partial decomposition into elementary carbon and hydrogen.

The character of the present invention and its practical applications are sufficiently developed and exemplified by the foregoing specification and limited examples. However, neither section is to be construed as unduly limiting upon its proper scope.

I claim as my invention:

1. A process for the treatment of normally fluid paraffinic hydrocarbons to produce the corresponding olefinic hydrocarbons, which comprises subjecting paraffinic hydrocarbons to the action of a catalyst, comprising essentially aluminum oxide and a compound of molybdenum, at a temperature adequate to dehydrogenate and convert said paraffinic hydrocarbons into olefin hydrocarbons, and recovering the olefin hydrocarbons thus formed.

2. A process for the treatment of normally gaseous paraffinic hydrocarbons, which comprises treating said paraffinc hydrocarbons with a catalyst, comprising essentially activated alumina and an oxide of molybdenum, at a temperature adequate to dehydrogenate and convert said paraffinic hydrocarbons into olefin hydrocarbons, and recovering the olefin hydrocarbons thus formed.

3. A process for the treatment of normally fluid paraffinic hydrocarbons to produce the corresponding olefinic hydrocarbons, which comprises subjecting paraffinic hydrocarbons to the action of a catalyst, comprising essentially aluminum oxide and a lower oxide of molybdenum, at a temperature adequate to dehydrogenate and convert said paraffinic hydrocarbons into olefin hydrocarbons, and recovering the olefin hydrocarbons thus formed.

4. A process for the treatment of normally fluid paraffinic hydrocarbons to produce the corresponding olefinic hydrocarbons, which comprises subjecting paraffinic hydrocarbons to the action of a catalyst, comprising essentially aluminum oxide and a compound of molybdenum, at a temperature of from 400° to 800° C. to dehydrogenate and convert said paraffinic hydrocarbons into olefin hydrocarbons, and recovering the olefin hydrocarbons thus formed.

5. A process for the treatment of normally fluid paraffinic hydrocarbons to produce the corresponding olefinic hydrocarbons, which comprises subjecting paraffinic hydrocarbons to the action of a catalyst, comprising essentially aluminum oxide and a compound of molybdenum, at a temperature of from 500° to 600° C. to dehydrogenate and convert said paraffinic hydrocarbons into olefin hydrocarbons, and recovering the olefin hydrocarbons thus formed.

6. A process for the treatment of normally gaseous paraffinic hydrocarbons to produce the corresponding olefinic hydrocarbons, which comprises treating said paraffinic hydrocarbons with a catalyst, comprising essentially aluminum oxide and minor amounts of lower oxides of molybdenum, at a temperature of from 400° to 800° C. to dehydrogenate and convert the paraffin hydrocarbons into olefin hydrocarbons, and recovering the latter.

7. A process for the treatment of normally gaseous paraffinic hydrocarbons to produce the corresponding olefinic hydrocarbons, which comprises treating said normally gaseous paraffinic hydrocarbons with a catalyst, comprising essentially aluminum oxide containing approximately two to five percent of an oxide of molybdenum, at a temperature of from 500° to 600° C. to dehydrogenate and convert the paraffin hydrocarbons into olefin hydrocarbons, and recovering the latter.

8. A process for the treatment of normally gaseous paraffinic hydrocarbons to produce the corresponding olefinic hydrocarbons, which comprises treating said normally gaseous paraffinic hydrocarbons with a catalyst, comprising essentially aluminum oxide containing approximately two to five percent of an oxide of molybdenum, at a temperature of from 500° to 600° C., and for a time period greater than 3.5 seconds and less than 8 seconds, to dehydrogenate and convert the paraffin hydrocarbons into olefin hydrocarbons, and recovering the latter.

9. A process for treating normally fluid paraffin hydrocarbons which comprises contacting the paraffins under hydrogenating conditions with a catalyst comprising a major proportion of aluminum oxide and a minor proportion of molybdenum oxide.

ARISTID V. GROSSE.

CERTIFICATE OF CORRECTION.

Patent No. 2,194,280.  March 19, 1940.

ARISTID V. GROSSE.

It is hereby certified that error appears in the printed specification of the above numbered patent requiring correction as follows: Page 4, second column, line 2, claim 9, for "hydrogenating" read --dehydrogenating--; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.